Jan. 5, 1932.   H. McGHEE   1,839,984
RUBBER SOLED FOOTWEAR
Original Filed Feb. 21, 1929
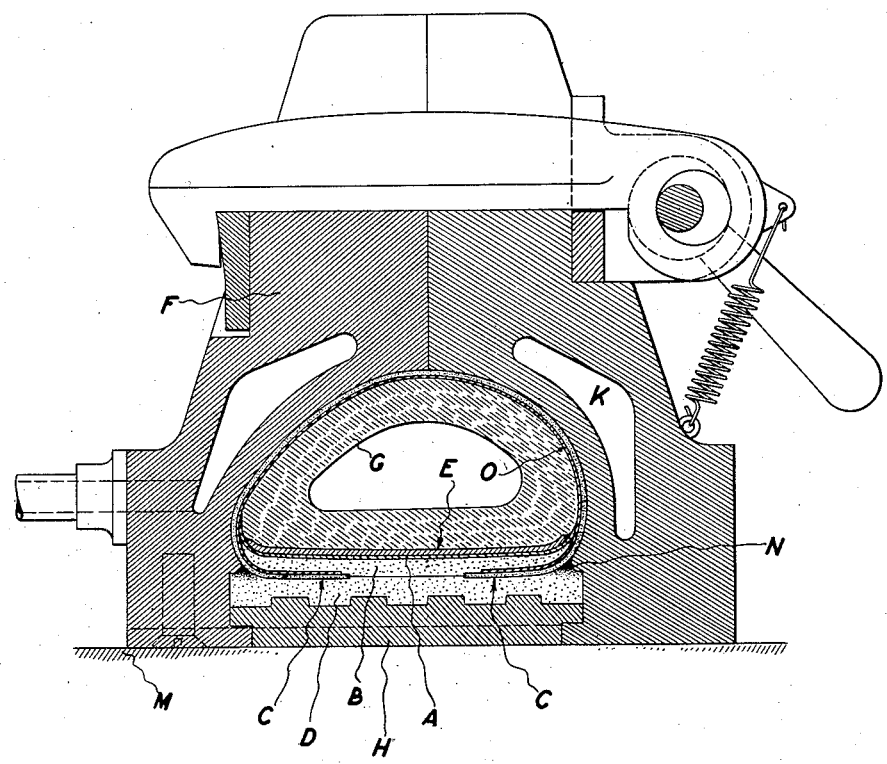
Inventor
 Henry McGhee
By
E. F. Wenderoth
Atty.

Patented Jan. 5, 1932

1,839,984

UNITED STATES PATENT OFFICE

HENRY McGHEE, OF RUSHCUTTERS BAY, NEAR SYDNEY, NEW SOUTH WALES, AUSTRALIA

RUBBER-SOLED FOOTWEAR

Original application filed February 21, 1929, Serial No. 341,791, and in Australia June 14, 1928. Divided and this application filed March 5, 1931. Serial No. 520,357.

This invention relates to shoes and other footwear having a cured rubber sole fixed to the skirt of a leather upper integrally, without stitching.

Heretofore shoes having moulded rubber soles directly and integrally united by rubber to leather uppers were not known, and they are, in effect, a new product in the trade.

Many attempts have been made to produce such shoes by an open cure process, but these attempts have failed because it was found that the leather is curled and hardened in the curing process so that it permanently loses its flexible characteristics and is made liable to crack and break. I have discovered, however, that if the goods are completely enclosed each piece in its own mould and held tightly pressed against the mould, and if the temperature of the mould is not allowed to rise too high where it contacts with the leather portion of the shoe, the leather does not suffer the destructive action which occurs in the open cure method above referred to, and it is then possible to obtain entirely satisfactory products.

The accompanying drawing is a vertical sectional elevation showing a shoe constructed according to the present invention, enclosed in a press cure mould.

In building a shoe according to the present invention, a last is selected of somewhat smaller dimensions than the finished dimensions of the shoe to be produced. Upon the sole of this last an insole piece A of fabric or leather is laid down and upon this insole piece a cover sole B of rubber dough containing vulcanizing and accelerating ingredients is applied, attachment being effected by wetting the contacting surfaces with a rubber solvent, or a solution of rubber. The skirt portion C of the leather upper is served with rubber solution containing also vulcanizing and accelerating ingredients and the upper is pulled over the cover sole and the skirt of it hammered and rolled down on to the cover sole so as to ensure adhesion between the rubberized skirt and the rubber in the cover sole. The toe and heel portions of the skirt are pleated in and a serving of rubber solution or thin rubber paste also carrying vulcanizing and accelerating ingredients is painted over the downturned skirt so as to ensure as complete adhesion as possible and to provide a maximum stickiness to ensure satisfactory attachment of the tread sole to the cover sole and the upper skirt. A tread sole piece D (with or without attached heel lift) is now laid over the work and pressed down so as to adhere it to the underface of the cover sole B and to the pleated-in-skirting C. No tacking or stitching is required to hold the upper skirt C during the lasting process. After the tread sole D has been applied in the way described, the thus built up shoe is removed from the last and a hard metal false plate E is inserted in it to lie upon the insole A. Then, the structure is completely enclosed in a mould F and a rubber inflation bag G is set within the shoe, and the mould F is closed and locked. The mould is of full size dimensions and it is carried on a hot table M, or the bed of it is directly heated by steam or may be heated electrically or by gas. The hot table arrangement is, however, the preferable one, as a better control of the temperature is thus ensured. The upper part of the mould, which, like the sole portion of it, is of metal, is exposed to atmosphere, and there is consequently a temperature gradient diminishing from the sole plate H to the top portion of the mould. Pressure is raised in the inflation G to about 100 lbs. on the square inch, and this pressure is maintained during the vulcanization period; the length of that period depends upon the characteristics of the rubber mixture. In order to obtain a satisfactory curing of the rubber, regard is had to the fact that the temperature is a maximum under the sole and that it diminishes rapidly upwardly from the sole. Considerable heat is absorbed in the rubber soles D and B and the temperature of the upper part of the mould does not therefore rise as rapidly as it would do if a shoe were not in the mould; therefore the temperature to which the skirt leather is subjected does not rise to a point so high as to injure the leather goods. To ensure maintenance of a cool condition in the upper part of the mould, the castings of which the mould is built up may have cellular cavities K formed in them and flexible pipe connections to enable water to be circulated through them to draw off heat transmitted upwardly from the hot sole plate of the mould.

As the tread sole D is subjected to a higher temperature than the cover sole B and the skirt C of the upper, the rubber mixture used in the cover sole B should contain a higher proportion of vulcanizing and accelerating ingredients than the tread sole D. By appropriately proportioning the ingredients uniform curing is effected. When pressure is is applied through the inflated member G, flatness of the sole is maintained, risk of thinning the sole is prevented, and even distribution of temperature over the whole area of the sole is ensured by the metal false plate E which lies between the inflation G and the insole A. The pressure applied expands the upper and brings it to the full size of the mould, and in this expansion the skirt portion C of the upper is drawn some distance outwardly from between the cover sole B and the tread sole D, bringing with it an edging of rubber taken from the tread sole; this edging forms a foxing N which fills the welt seam and extends as a margining on the leather and offers a not inconsiderable security against risk of burning or otherwise damaging the upper. The adhesion obtained between the upper and the soles is very effective and it is not ordinarily possible to tear away the upper from the sole of a shoe made according to this method.

At the conclusion of the press cure operation the air pressure is released from the inflation G, the mould is opened out, the cured shoe withdrawn and the inflation G and metal false plate E are withdrawn from it. The process of construction is substantially identical in the case of boots, shoes, and slippers.

Commercial success is obtainable only when appropriately compounded rubber is used for the tread sole, the insole, and the liquid serving rubber, which is painted on the contacting surfaces in the building up of the soles, and for the impregnation of the skirt portion of the upper to render it adhesive to the rubber sole pieces. The respective mixtures are proportioned to obtain even curing throughout the rubberized structure having regard to the temperature gradient, which is a maximum at the hot table and tapers away towards the top portion of the mould. A reasonable liberty may be taken in varying the proportions of the ingredients and in modifying the filler ingredients.

In order to minimize liability of thin leather splits to stretch, it is in most cases desirable to reinforce them with liners O of leather or woven fabric or sheep skin. The joints in the lining should not register with the joints in the upper. A most effective reinforcement is obtained when the liner is continuous under the joints of the upper, and the harshness of the joints is thus also minimized. The liner is secured to the upper around all the marginal portions of it, or may be all over its surface, by adhering it by means of rubber gum which may contain some vulcanizing elements so that a permanent union is obtained in the vulcanizing process; the margins may also be sewn together.

The manipulations practiced in the building up of the shoe on the last will be readily understood by bootmakers from the foregoing description. It is to be emphasized that for a shoe of any given size the last must be undersized so that when the goods are subjected to the inflation pressure in the mould the upper will be stretched and the expanded so that the skirt portion C of it will draw out from between the cover sole B and the tread sole D and carry with it a margin of rubber which will form a foxing N which will fill the welt seam, closing it effectively and perfecting the attachment of the upper to the sole. The extent of the expansion thus to be provided for should be from an eighth of an inch to a quarter of an inch in the width, and on the length of the shoe. The clearance also facilitates the insertion of the goods into the mould. The spreading of the sole piece in all directions laterally ensures a working of the rubber so that a clean full finish is obtained and a perfect bond is established between the sole rubber and the upper skirt. No less important is the perfect shaping of the shoe which is thus ensured as any bagginess or irregularity of make up on the last is compensated in the mould in the stretching of the upper and the spreading of the sole.

What I claim as my invention and desire to secure by Letters Patent is:—

1. An article of footwear comprising an upper constructed of leather, a rubber cover sole, a rubber tread sole, the skirt of said upper being marginally pleated in between said cover sole and said tread sole, said cover sole, skirt and tread sole being integrally united together by vulcanization and the rubber integral with said rubber tread sole filling the welt seam and forming a foxing above the welt.

2. A new article of manufacture comprising an upper constructed of leather, a lining united to said upper by rubber adhesive, a rubber cover sole, a rubber tread sole, said cover sole and tread sole being integrally united to the pleated end skirt of said upper and of said lining by vulcanization and the rubber integral with said tread sole filling the welt seam and forming a foxing above the welt.

3. A new article of manufacture comprising an upper constructed of leather, a lining which is continuous under the joints of said upper and being united to said upper by rubber adhesive, a rubber cover sole, a rubber tread sole, said cover sole and tread sole being cohered and integrally united to the pleated end skirt of said upper and of said lining by vulcanization and rubber integral with said tread sole filling the welt seam and forming a foxing above the welt.

In testimony whereof I affix my signature.

HENRY McGHEE.